US010397202B2

(12) United States Patent
Riscombe-Burton et al.

(10) Patent No.: US 10,397,202 B2
(45) Date of Patent: Aug. 27, 2019

(54) SECURE COMMUNICATION CHANNELS

(71) Applicant: BLACKBERRY LIMITED, Waterloo (CA)

(72) Inventors: Phillip Riscombe-Burton, London (GB); Siavash James Joorabchian Hawkins, London (GB); Sean Michael Quinlan, Duvall, WA (US); Haniff Somani, Redwood Shores, CA (US); Sanjiv Maurya, Fremont, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 563 days.

(21) Appl. No.: 15/103,998

(22) PCT Filed: Dec. 11, 2014

(86) PCT No.: PCT/US2014/069823
§ 371 (c)(1),
(2) Date: Jun. 13, 2016

(87) PCT Pub. No.: WO2015/089318
PCT Pub. Date: Jun. 18, 2015

(65) Prior Publication Data
US 2016/0315923 A1 Oct. 27, 2016

(30) Foreign Application Priority Data

Dec. 12, 2013 (GB) .................... 1322032.2
Dec. 12, 2013 (GB) .................... 1322033.0

(51) Int. Cl.
H04L 29/06 (2006.01)
H04L 9/08 (2006.01)
(Continued)

(52) U.S. Cl.
CPC .......... *H04L 63/061* (2013.01); *H04L 9/0827* (2013.01); *H04L 63/0281* (2013.01);
(Continued)

(58) Field of Classification Search
CPC . H04L 63/061; H04L 9/0827; H04L 63/0281; H04L 63/0442; H04L 63/10; H04L 63/18; H04W 12/04
See application file for complete search history.

(56) References Cited

U.S. PATENT DOCUMENTS 7,120,692 B2* 10/2006 Hesselink ........... H04L 63/0209
709/225
2003/0065941 A1* 4/2003 Ballard ................... H04L 63/04
726/1
(Continued)

OTHER PUBLICATIONS

Harn et al., A Protocol for Establishing Secure Communication Channels in a Large Network, Feb. 1994, IEEE Transactions on Knowledge and Data Engineering, pp. 188-191 (Year: 1994).*
(Continued)

*Primary Examiner* — Kenneth W Chang
(74) *Attorney, Agent, or Firm* — Fish & Richardson P.C.

(57) ABSTRACT

A method and system for negotiating a secure device-to-device communications channel between a first computing device and a second computing device, wherein the first computing device is associated with a first user and the second computing device is associated with a second user. The method comprises receiving, at a server, a first connection request comprising first address data and a first cryptographic key associated with the first computing device, the first connection request being received over a first secure communications channel, and receiving, at the server, a second connection request comprising second address data and a second cryptographic key associated with the second
(Continued)

computing device, the second connection request being received over a second secure communications channel.

38 Claims, 8 Drawing Sheets

(51) Int. Cl.
  *H04W 12/04* (2009.01)
  *H04L 29/08* (2006.01)

(52) U.S. Cl.
  CPC .......... *H04L 63/0442* (2013.01); *H04L 63/10* (2013.01); *H04L 63/18* (2013.01); *H04W 12/04* (2013.01); *H04L 67/146* (2013.01); *H04L 2209/76* (2013.01)

(56) References Cited

U.S. PATENT DOCUMENTS

| | | |
|---|---|---|
| 2004/0034776 A1 | 2/2004 | Fernando et al. |
| 2005/0027810 A1 | 2/2005 | Donovan |
| 2005/0246769 A1* | 11/2005 | Bao .................. H04L 63/08 726/16 |
| 2008/0235511 A1* | 9/2008 | O'Brien .............. H04L 9/0844 713/171 |
| 2009/0158394 A1 | 6/2009 | Oh et al. |
| 2009/0158416 A1 | 6/2009 | Statia |
| 2010/0064133 A1 | 3/2010 | Martin et al. |
| 2010/0082481 A1 | 4/2010 | Lin et al. |
| 2010/0154050 A1 | 6/2010 | Mukkara et al. |
| 2011/0231659 A1* | 9/2011 | Sinha .................. H04L 63/06 713/168 |
| 2012/0030739 A1* | 2/2012 | Vadapalli .............. H04L 9/0838 726/6 |
| 2012/0331300 A1 | 12/2012 | Das et al. |
| 2013/0081113 A1* | 3/2013 | Cherian ................. H04W 4/70 726/4 |
| 2013/0315393 A1 | 11/2013 | Wang et al. |
| 2014/0006347 A1* | 1/2014 | Qureshi ................. G06F 21/10 707/621 |

OTHER PUBLICATIONS

International Search Report and Written Opinion of the International Searching Authority issued in International Application No. PCT/US2014/069823 dated Mar. 13, 2015; 11 pages.

Communication under Rule 71(3) EPC issued in European Application No. 14868833.6 dated Oct. 10, 2018, 50 pages.

TPS, "Use of & Switchover to Infrastructure Path for ProSe," 3GPP Draft, SA WG2 Meeting #S2-99 (S2-133144), Sep. 23-27, 2013, Xiamen, China; 13 pages; <http://www.3gpp.org/ftp/tsg_sa/WG2_Arch/TSGS2_99_Xiamen/Docs/>.

Extended European Search Report issued in European Application No. 14868833.6 dated Aug. 2, 2017; 10 pages.

* cited by examiner

SECURE COMMUNICATION CHANNELS

CROSS-REFERENCE TO RELATED APPLICATIONS

This application is a U.S. National Stage of PCT/US2014/069823, filed on Dec. 11, 2014, which claims priority under 35 U.S.C. § 119(a) to U.K. Application No. GB1322032.2, filed on Dec. 12, 2013, and U.K. Application No. GB1322033.0, filed on Dec. 12, 2013, the entire contents of each of which are hereby incorporated by reference.

BACKGROUND OF THE INVENTION

Field of the Invention

The present invention relates to methods and apparatus for negotiating a secure device-to-device communication channel.

Description of the Related Technology

Secure platforms provide an architecture for deployment and management of secure applications running on computing devices. A secure application enables an enterprise to deploy sensitive data to the respective computing device, and to remotely manage the sensitive data in a secure manner. For example, such management may include remote deletion of the sensitive data in the event that the computing device is compromised or in the event that the user of the computing device leaves the employment of the enterprise.

Typically, the secure application also provides secure access to data and services provided by an enterprise network, such as enterprise e-mail services for storing, sending and receiving e-mail; enterprise file sharing services for storing and retrieving files; enterprise database services for accessing and modifying an enterprise database; enterprise Personal Information Management (PIM) services for accessing and modifying personal information such as contact lists, calendars and task lists; and other services including enterprise resource planning, customer relationship management, field/support force automation, and consumer data content storage, etc.

At least some of the data managed by the secure application running on the mobile device is stored in encrypted format. The data maybe encrypted using methods as known in the art. For example, the encryption may employ "containerisation", according to which the data is encrypted and "wrapped" in a container to which various access policies can be applied to control which users can access the data within the container. The access policies can for example be determined and varied if desired by a remote user, such as an administrator of an enterprise network.

An example of a secure platform which employs secure applications in this manner is the Good Dynamics™ mobile platform developed by Good Technology™ of Sunnyvale, Calif., United States.

SUMMARY

A first aspect provides a method of negotiating a secure device-to-device communications channel between a first computing device and a second computing device the first computing device being associated with a first user and the second computing device being associated with a second user, the method comprising: receiving, at a server, a first connection request comprising first address data and a first cryptographic key associated with a first computing device, the first connection request being received over a first secure communications channel; receiving, at the server, a second connection request comprising second address data and a second cryptographic key associated with a second computing device, the second connection request being received over a second secure communications channel; determining, on the basis of an identity of the first user and an identity of the second user, that the secure device-to-device communication channel is permitted and, dependent on a determination that the secure device-to-device communication channel is permitted: sending, from the server, first connection data to the first computing device over the first secure communications channel; and sending, from the server, second connection data to the second computing device over the second secure communications channel; wherein the first connection data comprises the second address data and second cryptographic key, and the second connection data comprises the first address data and first cryptographic key, the first and second connection data being for use in enabling establishment of a secure device-to-device communications channel between the first computing device and the second computing device. Thus, according to this first aspect, the address data and the cryptographic keys necessary to establish the secure device-to-device communication channel are exchanged "out of band" using pre-established secure communications channels, thereby obviating the need to negotiate the secure device-to-device connection over a potentially insecure and untrusted communications channel. Once this first connection data and the second connection data has been exchanged between the devices according to the first aspect, a direct secure device-to-device communications channel between the first computing device and the second computing device can be established.

This enables the server to enforce user polices on the secure device-to-device communications channel based on the users associated with the first and second computing devices. For example, the server may retrieve permission data associated with the first user and the second user, and the determination that the secure device-to-device communications channel between the first computing device and the second computing device is permitted may be based on the retrieved permission data.

In some embodiments, the first connection request comprises an indication of the second user, and the method comprises, responsive to receipt of the first connection request, sending a connection notification indicative of a pending connection request to one or more computing devices associated with the second user, wherein the one or more computing devices includes the second computing device. In this manner, the first user can ensure that the connection request is sent to the second computing device based on an identifier associated with the second user. For example, the method may comprise determining the one or more computing devices associated with the second user using the indication of the second user in the first connection request. In some embodiments, the second connection request is sent to the server by the second computing device responsive to receipt of the connection notification at the second computing device.

In some embodiments, the first connection request comprises a first session identifier and the second connection request includes a second session identifier, and wherein the sending of the first connection data and the sending of the second connection data is conditional on the first session identifier corresponding to the second session identifier. In this manner, the identity of the first and second computing devices can be authenticated. For example, the first session identifier and the second session identifier may correspond to a user identity associated with the first computing device or the second computing device. Alternatively, the first session identifier and the second session identifier may correspond to a predetermined challenge exchanged between the first computing device and the second computing device prior to receipt of the first connection request and the second connection request.

In some embodiments, the first connection request indicates an intended use of the secure device-to-device communications channel. This enables the server to enforce usage policies on the secure device-to-device communications channel based on the intended use. For example, the first connection request may identify data to be transferred from the first computing device to the second computing device using the secure device-to-device communications channel. Alternatively or additionally, the first connection request may indicate a specified service running on the first computing device to be shared with the second computing device using the secure device-to-device communications channel. Thus, according to these embodiments, sending the first connection data and the second connection data may be dependent on a determination that the secure device-to-device communications channel is permitted on the basis of the intended use of the secure device-to-device communications channel.

In some embodiments, the first connection request indicates a communications medium for establishment of the secure device-to-device communications channel. For example, the communications medium may be Bluetooth™, a local area network, Near Field Communication (NFC), or Wi-Fi™. Moreover, in some embodiments, the communications medium for establishment of the secure device-to-device communications channel is different from the communications medium associated with the first secure communications channel and the communications medium associated with the second secure communications channel.

In some embodiments the first computing device and the second computing device are authenticated by the server.

In some embodiments the computing device is a portable computing device.

A second aspect provides a server system for negotiating a secure device-to-device communications channel between a first computing device and a second computing device the first computing device being associated with a first user and the second computing device being associated with a second user, wherein the server system is configured to: receive a first connection request comprising first address data and a first cryptographic key associated with a first computing device, the first connection request being received over a first secure communications channel; receive a second connection request comprising second address data and a second cryptographic key associated with a second computing device, the second connection request being received over a second secure communications channel; determine, on the basis of an identity of the first user and an identity of the second user, that the secure device-to-device communication channel is permitted and, dependent on a determination that the secure device-to-device communication channel is permitted: send first connection data to the first computing device over the first secure communications channel; and send second connection data to the second computing device over the second secure communications channel; wherein the first connection data comprises the second address data and second cryptographic key, and the second connection data comprises the first address data and first cryptographic key, the first and second connection data being for use in enabling establishment of a secure device-to-device communications channel between the first computing device and the second computing device.

A third aspect provides a computer program product comprising a non-transitory computer-readable storage medium having computer readable instructions stored thereon, the computer readable instructions being executable by a computerized device to cause the computerized device to perform a method for negotiating a secure device-to-device communications channel between a first computing device and a second computing device the first computing device being associated with a first user and the second computing device being associated with a second user, the method comprising: receiving, at a server, a first connection request comprising first address data and a first cryptographic key associated with a first computing device, the first connection request being received over a first secure communications channel; receiving, at the server, a second connection request comprising second address data and a second cryptographic key associated with a second computing device, the second connection request being received over a second secure communications channel; determine, on the basis of an identity of the first user and an identity of the second user, that the secure device-to-device communication channel is permitted and, dependent on a determination that the secure device-to-device communication channel is permitted: sending, from the server, first connection data to the first computing device over the first secure communications channel; and sending, from the server, second connection data to the second computing device over the second secure communications channel; wherein the first connection data comprises the second address data and second cryptographic key, and the second connection data comprises the first address data and first cryptographic key, the first and second connection data being for use in enabling establishment of a secure device-to-device communications channel between the first computing device and the second computing device.

A fourth aspect provides method of initiating a secure device-to-device communications channel between a first computing device and a second computing device, the method comprising: sending, to a server from a first computing device, a connection request comprising a first cryptographic key and first address data associated with the first computing device, the connection request being sent over a first secure communications channel; receiving, at the first computing over the first secure communications channel, connection data associated with a second computing device, the connection data comprising permission data, second address data and a second cryptographic key; establishing a secure device-to-device communications channel with the second computing device using the connection data; and selectively transmitting the application data to the second computing device over the secure device-to-device communications channel based on the permission data. Thus, according to this first aspect, the address data and the cryptographic keys necessary to establish the secure device-to-device communication channel are exchanged "out of band" using pre-established secure communications channels, thereby obviating the need to negotiate the secure device-to-device connection over a potentially insecure and untrusted communications channel.

In some embodiments, the method comprises receiving, at the first computing device, a connection notification indicative of a pending connection request from the second computing device, and sending of the first connection request is responsive to receipt of the connection notification at the first computing device.

In some embodiments, the first connection request comprises an indication of a second user associated with the second computing device. In this manner, the identity of the first and second computing devices can be authenticated.

In some embodiments, the first connection request comprises a first session identifier. In this manner, the identity of the first and second computing devices can be authenticated. For example, the session identifier corresponds to a user identity associated with the first computing device or the second computing device. Alternatively, the session identifier may correspond to a predetermined challenge exchanged between the first computing device and the second computing device prior to sending of the first connection request.

In some embodiments, the connection request indicates an intended use of the secure device-to-device communications channel. This enables the server to enforce usage policies on the secure device-to-device communications channel based on the intended use. For example, the connection request may identify data to be transferred from the first computing device to the second computing device using the secure device-to-device communications channel. Alternatively or additionally the connection request may indicate a specified service running on the first computing device to be shared with the second computing device using the secure device-to-device communications channel. Thus, according to these embodiments, sending the first connection data and the second connection data may be dependent on a determination that the secure device-to-device communications channel is permitted on the basis of the intended use of the secure device-to-device communications channel.

In some embodiments, the connection request indicates a communications medium for establishment of the secure device-to-device communications channel. For example, the communications medium may be Bluetooth™, a local area network, Near Field Communication (NFC) or Wi-Fi™.

In some embodiments, the first computing device comprises a secure application and the secure device-to-device communications channel is established between the secure application and the second computing device. The secure application may control data transmitted over the secure device-to-device communications channel. In this manner, the secure application can enforce polices related to the use of the secure device-to-device communications channel.

In some embodiments, the first and second computing devices are portable computing devices.

A fifth aspect provides a computing device for secure management of application data, the computing device being provided with a secure application for controlling transmission of the application data over a secure device-to-device communications channel, wherein the secure application is configured to: establish a first secure communications channel to a server; send, to the server, a connection request comprising a cryptographic key and address data associated with the computing device, the connection request being sent over the first secure communications channel; receiving, from the server, connection data comprising permission data and address data and a cryptographic key associated with a recipient computing device, the connection data being received over the first secure communications channel; establish a secure device-to-device communications channel with the recipient computing device using the connection data; and selectively transmit the application data to the recipient computing device over the secure device-to-device communications channel based on the permission data.

In this manner, the secure application can enforce polices related to the use of the secure device-to-device communications channel as specified by the permission data provided by the server.

In some embodiments the secure application stores the application data in a secure container on the computing device.

In some embodiments, the application data relates to a service provided by the secure application.

In some embodiments, the computing device is a portable computing device.

A sixth aspect provides a computer program product comprising a non-transitory computer-readable storage medium having computer readable instructions stored thereon, the computer readable instructions being executable by a computerized device to cause the computerized device to perform a method for initiating a secure device-to-device communications channel between a first computing device and a second computing device, the method comprising: sending, to a server from a first computing device, a connection request comprising a first cryptographic key and first address data associated with the first computing device, the connection request being sent over a first secure communications channel; receiving, at the first computing over the first secure communications channel, connection data associated with a second computing device, the connection data comprising permission data, second address data and a second cryptographic key; establishing a secure device-to-device communications channel with the second computing device using the connection data; and selectively transmitting the application data to the second computing device over the secure device-to-device communications channel based on the permission data.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
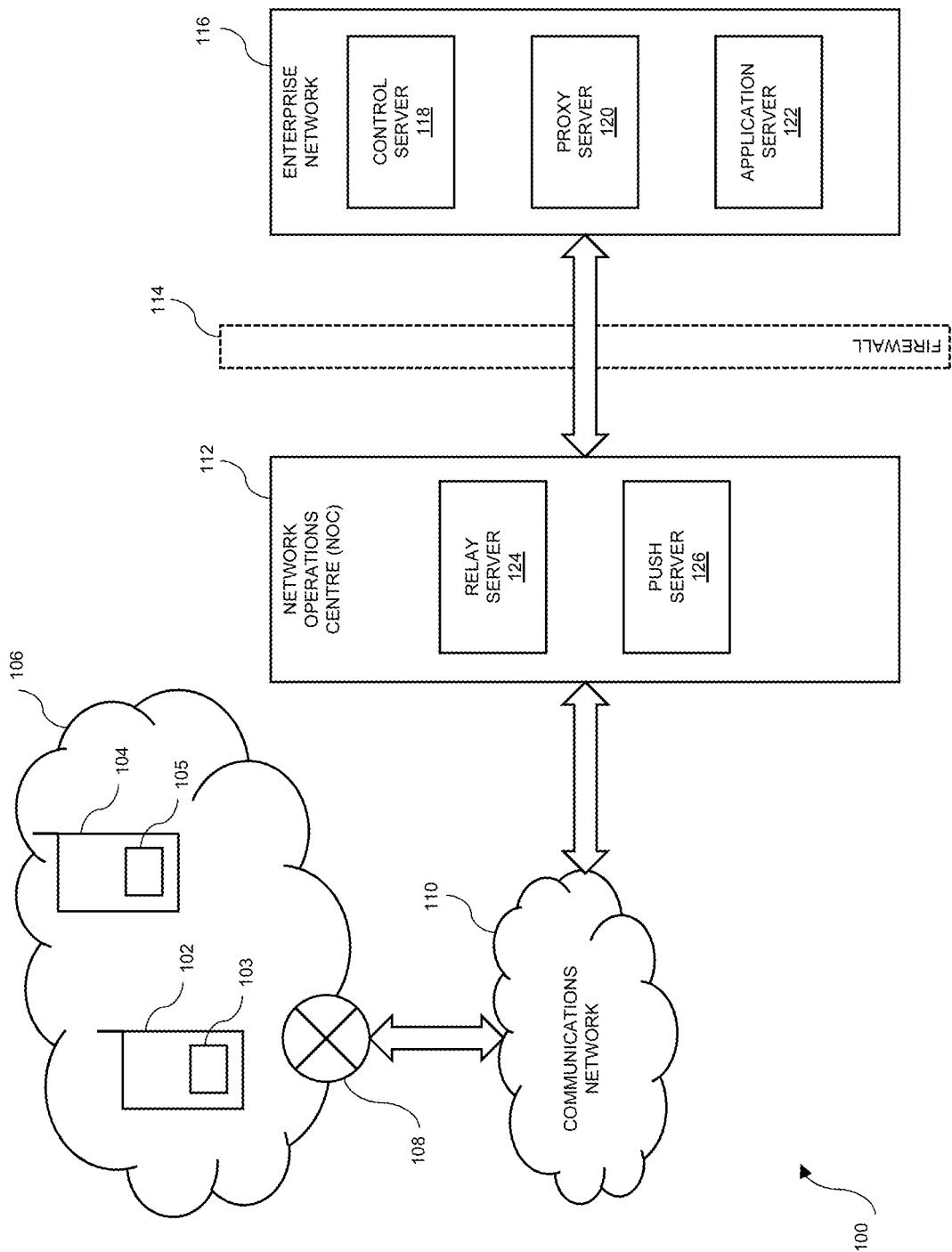
FIG. 1 is a schematic diagram showing a system for negotiating a secure device-to-device communications channel between a first computing device and a second computing device according to an embodiment.

In some situations, a user may wish to securely share or distribute sensitive data managed by a secure application configured on their computing device with the one or more parties located in the vicinity of the user. For example, the user may wish to share a confidential presentation, stored or managed by the secure application, with one or more participants in a meeting or seminar. Thus, in order to minimize the risk that the data may be intercepted or otherwise obtained by an unauthorized party, the user may wish to ensure that the sensitive data does not "leave" a particular domain, such as a particular meeting room, a particular building, or a particular corporate computer network. In such circumstances, it is desirable to establish a device-to-device communications channel (i.e. a device-to-device connection) between the user's device and the devices belonging to the one or more parties, such that the sensitive data can be exchanged locally and without leaving the particular domain in question.

In this context, a device-to-device communications channel is a communication channel which is established between two devices which are directly addressable with respect to each other. For example, a device-to-device communications channel may be established over Local Area Network (LAN) by using the private Internet Protocol (IP) addresses (i.e. a routable IP address) assigned to the respective computing devices. In contrast, a device-to-device communications channel may in some circumstances be undesirable in situations where one or both of the computing devices is "hidden" behind a network appliance, such as a Network Address Translator (NAT), and thus may not be associated with a routable IP address.

A device-to-device communications channel can be further characterized as either a "direct" device-to-device communications channel, where data is exchanged directly between the parties without involvement of a third party, or an "indirect" device-to-device communications channel where data is exchanged via a third party.

Examples of technologies suitable for establishing a direct device-to-device communications channel are Bluetooth™, NFC, Wi-Fi Direct™, Infrared (e.g. IrDA™), and the proposed device-to-device (D2D) protocols for the Long Term Evolution (LTE) mobile communications standard. Similarly, a direct device-to-device communications channel may be established using an ad-hoc wireless network based on the Institute of Electrical and Electronics Engineers (IEEE) 802.11 standards (Wi-Fi™). According to each of these technologies, transmission of the data is restricted to a geographical domain associated with the physical capabilities of the respective interface (i.e. the wireless range of the computing devices party to the connection). Use of a direct device-to-device communications channel may be preferred in situations where the party initiating the communications channel desires some certainty with respect to the physical domain over which the associated data will be transmitted.

Examples of indirect device-to-device communications channels are communications channels established over a private network, such as a Local Area Network (LAN) or a Wireless Local Area Network (WLAN) based on Wi-Fi™, according to which data is transmitted via one or more third parties (e.g. a wireless access point and/or a network switch). According to these technologies, transmission of the data may be restricted to the geographical domain associated with the physical extent of the private network, and is not necessarily restricted by the capabilities of the computing devices themselves. Use of an indirect device-to-device communications channel may be preferred in situations where the parties involved are relatively remote (e.g. located in different rooms of a particular building) but the party initiating the communications channel desires to restrict the domain over with the associated data will be transmitted to a private network or similar.

The data to be shared or distributed via the device-to-device communications channel may be the property of an enterprise or an organization, and may therefore relate to confidential business information (hereinafter termed "enterprise data"). It is therefore desirable to ensure that this enterprise data is shared in a secure manner and that safeguards are employed to prevent the enterprise data from being shared with an unauthorized party or a compromised device. From this perspective, establishment of the device-to-device connection involves a number of considerations: (i) the user or users with which the enterprise data is to be shared must be authenticated by the enterprise and their associated computing devices must be uncompromised; (ii) users must be restricted to only sharing enterprise data that they are permitted to share and the enterprise data should only be shared with parties who are permitted to receive the data; and (iii) the device-to-device communications channel used to exchange the enterprise data must be secured (ei.ge. encrypted) to prevent third parties from intercepting the enterprise data in transit. In other words, the device-to-device communications channel must be a secure device-to-device communications channel.

An example of a system 100 for negotiating a secure device-to-device communications channel according to an embodiment is shown schematically in FIG. 1. The system includes a first computing device 102 and a second computing device 104 which are connected to a private network 106 which in turn provides access to a communications network 110. The communications network 110 may, for example, be or include the Internet, a Public Land Mobile Network (PLMN) and/or a Public Switched Telephone Network (PSTN). The private network 106 may for example be or include a Local Area Network (LAN) and/or a Wireless Local Area Network (WLAN) which interfaces with the communications network 106 via a router 108. In alternative embodiments, one or both of the first and second computing devices 102, 104 may access the communications network 110 using one or more of a number of radio access technologies (not shown) including, for example, Global System for Mobile Communications (GSM), Universal Mobile Telecommunications System (UMTS) and Long Term Evolution (LTE).

The first and second computing devices 102, 104 are configured with respective secure applications 103, 105, which are configured to securely manage enterprise data and to provide secure and authenticated access to one or more services provided by an enterprise network 116. In turn, the enterprise network 116 comprises a plurality of enterprise servers, such as a control server 118, a proxy server 120, and an application server 122.

The control server 118 provides functionality for provisioning and management of the secure applications 103, 105 running on the first and second computing devices 102, 104 respectively. Typically, the control server 118 is configured to authenticate the users of the first and second computing devices 102, 104 prior to provisioning the secure applications 103, 105. Similarly, the provisioning process may require the users of the computing devices 102, 104 to set a password (i.e. a secret) which is securely stored in the secure applications 103, 105 and used to authenticate the users when subsequently accessing or running the secure applications 103, 105. The control server 118 may also be configured to provide remote management of the secure applications 103, 105, such as remote locking or remote deletion of the enterprise data in the event that the associated computing device 102, 104 has been compromised in some way (e.g. stolen).

The application server 122 provides services and data to the secure applications 103, 105 running on the first and second computing devices 102, 104. For example, the application server 122 may be an enterprise document management server which provides the users with secure access to documents, such as product specifications, financial statements and/or sales presentations, etc. In this example, the secure applications 103, 105 are configured to securely access the application server 122 to retrieve the documents which may then be securely stored locally in the computing devices 102, 104 and managed by the secure applications 103, 105.

The proxy server 120 provides secure and authenticated access to the application server 122 from the secure applications 103, 105 running on computing devices 102, 104. To access the application server 122, the secure applications 103, 105 typically establish a secure communication channel with the proxy server 120, which in turn only allows the secure applications 103, 105 to access the application server 122 if permission to do so has been granted by an administrator.

Access to the enterprise network 116 is monitored and controlled by a Network Operations Centre (NOC) 112 and a firewall 114. The NOC 112 monitors incoming requests to access services provided by the enterprise network 116 and controls access to the enterprise using the firewall 114. The NOC 112 comprises a relay server 124 and a push server 126.

The relay server 124 facilitates establishment of secure and authenticated communication channels between the secure applications 103, 105 and the proxy server 120 over the communications network 110. The secure communications channels between the secure applications 103, 105 and the proxy server 120 are typically used to access services and data provided, for example, by the application server 122 as discussed above. Authentication of the client devices 102, 104 and/or the respective secure applications 103, 105 is typically performed using a network authentication protocol, such as the Kerberos™ protocol developed by the Massachusetts Institute of Technology, Cambridge, Mass., United States.

The push server 126 maintains an "always on" connection to the secure applications 103, 105 for delivery of push notifications to the computing devices 102, 104 on behalf of the enterprise servers 118, 120, 122. For example, the push server 126 may deliver push notifications to the secure applications 103, 105 to notify them of new data available via the application server 122 or new a new e-mail message received at an enterprise e-mail server (not shown).

Figure 2:
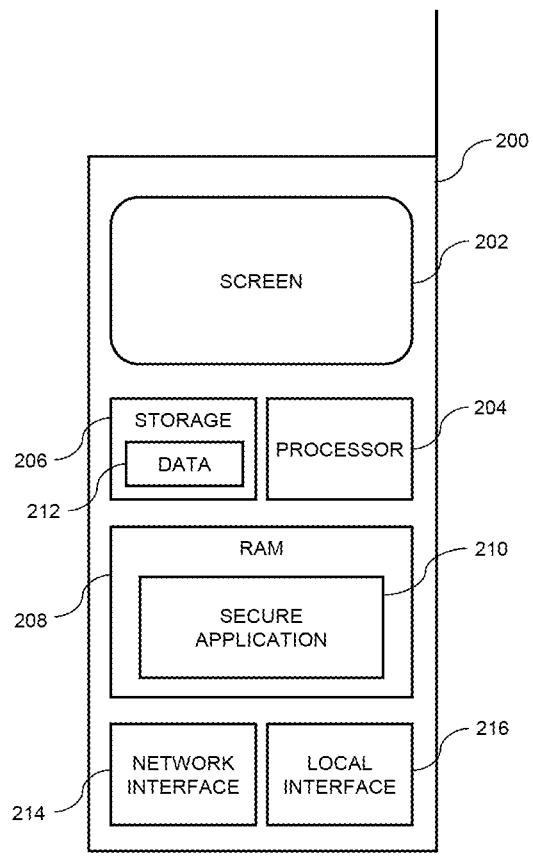
FIG. 2 is a schematic diagram showing a portable computing device according to an embodiment.

Typically, the first and second computing devices 102, 104 take the form of a portable computing device or a non-portable computing device, such as a desktop computer. An example of a portable computing device 200 according to an embodiment is shown schematically in FIG. 2. The portable computing device 200 may, for example, take the form of a smart phone, a personal digital assistance (PDA), a tablet computer or a notebook computer, etc. The portable computing device 200 includes a screen 202, which may be a touch screen for receipt of input from a user. Alternatively or additionally, the portable computing device 200 may include a physical keyboard (not shown), which may be integral to the portable computing device 200 or connected wirelessly or by wired connection to the portable computing device 200. The computing device further includes a processor 204, a non-volatile storage device 206 (such as a hard disk drive or a solid-state drive) and a random access memory (RAM) 208. The processor executes instructions stored in the random access memory 208 that have been loaded from the non-volatile storage device 206. These instructions are in the form of one or more programs that implement an operating system (not shown) and a secure application 210. The random access memory 208 is also used by programs running on the processor 204 as a means of storing and accessing data in the form of electronic signals where the data is used during the execution of the programs. The operating system provides a file system for storing, modifying and accessing files held in the non-volatile storage device 206. The file system may be accessible to other programs running on the processor 204 via the operating system. Programs running on the processor 204 also process user input obtained via the screen 202 or keyboard (not shown), etc.

The portable computing device 200 also includes a network interface 214 (or a plurality of network interfaces) which allows programs running on the processor 204 to transmit and receive data to and from other devices and/or servers via a communications, using wired and/or wireless connections. Typically, the network interface 214 is implemented in a combination of software and hardware (e.g. a network interface controller) to provide the necessary network connectivity to the programs running on the processor 204. Examples of network interface 214 include a Wi-Fi™ interface and/or a cellular radio interface utilizing standards such as GSM, UMTS and/or LTE.

In some embodiments, the portable computing device 200 also includes a local communication interface 216 (or a plurality of local communication interfaces) for establishing direct device-to-device communication channels with other computing devices in the vicinity of portable computing device 200. Examples of local communication interfaces include Bluetooth™, IrDA™ and NFC, etc.

The secure application 210 manages enterprise data 212 stored in encrypted form in the storage device 206. For example, the enterprise data 212 may be encrypted and "wrapped" in a data container to which various access policies can be applied by the secure application 210 to control which users and/or applications can access the enterprise data and how the enterprise data can be used. Typically, the access policies may be stored locally on the portable computing device 200, remotely in the application server 122, or distributed between the two. The access policies can for example be determined, and varied if desired, by an administrator of the enterprise network 116. The secure application 210 is configured to utilize the network interface 214 to establish secure connections with the various servers in the NOC 112 and the enterprise network 116 in the manner described above with reference to FIG. 1. The secure application is also able to access the network interface 214 and/or local interface 216 to establish one or more secure device-to-device connections with other computing devices in the vicinity of the portable computing device 200, as will now be described.

Figure 3:
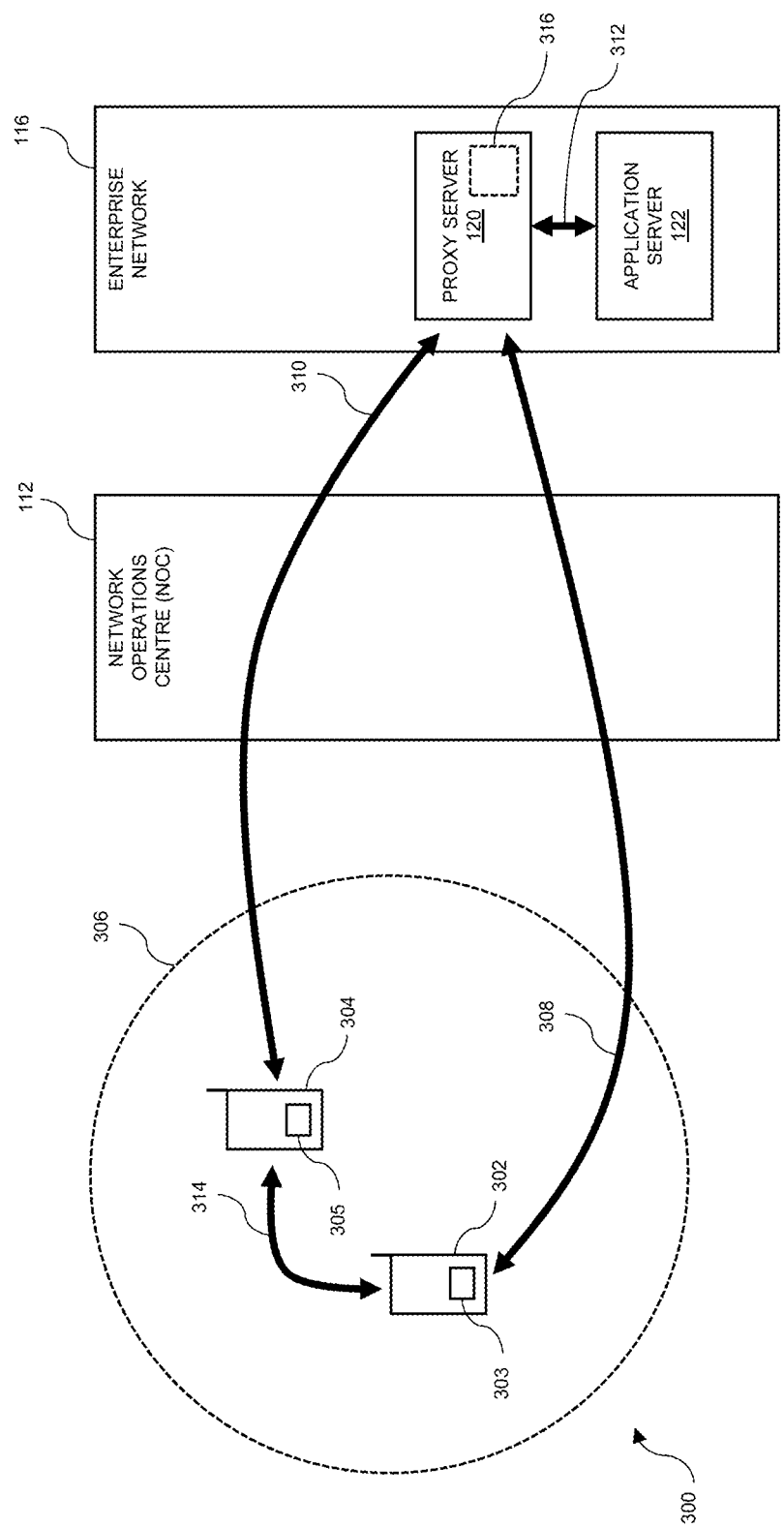
FIG. 3 is a schematic diagram showing the high-level data exchanges involved in establishment of a secure device-to-device connection between a first computing device and a second computing device according to an embodiment.

FIG. 3 shows schematically the high-level data exchanges involved in establishment of a secure device-to-device connection between a first computing device 302 (hereinafter termed the "initiating device") and a second computing device 304 (hereinafter termed the "receiving device") according to an embodiment. Typically, the first and second computing devices 302, 304 are portable computing devices of the type described above with reference to FIG. 2, but it will be understood that the one or both of the computing devices 302, 304 may be a non-portable computing device, such as a desktop computer. Specifically, the user of the initiating device 302 (hereinafter termed "initiating user") wishes to send enterprise data, such as a confidential presentation, to a user of the receiving device 304 (hereinafter termed "receiving user") a using a secure device-to-device communication channel. In this example, the initiating device 302 and the receiving device 304 are in relatively close proximity to each other (e.g. the same room 306). The initiating user and receiving user are trusted by the enterprise network 116 (e.g. an employee, trusted client or trusted supplier) and their respective computing devices 302, 304 have been provisioned with secure applications 303, 305 which have been authenticated by the NOC 112 in the manner described above with reference to FIG. 1.

In order to secure the device-to-device communications channel between the initiating device 302 and the receiving device 304, thereby preventing unauthorized interception of the enterprise data, public-private key cryptographic techniques are utilized. Thus, in order to secure the device-to-device communications channel, the secure application 303 running on the initiating device 302 and the secure application 305 running on the receiving device 304 must exchange their respective a public keys in a secure manner which is resistant to so called "man-in-the-middle attacks". Typically, the public-private key pairs for the computing devices 302, 304 are generated by the secure applications 303, 305 on a per-connection basis, thus preventing reuse to previously generated key pairs by unauthorized third parties. In order to establish the device-to-device communications channel, the secure application 303 running on the initiating device 302 requires address information for the receiving device 304, and the secure application 305 running on the receiving device 304 requires address information for the initiating device 302. For example, where the device-to-device communications channel is to be established over a LAN or WAN, the address information for the initiating device 302 and the receiving device 304 typically includes the IP address and a port number for the respective devices 302, 304. Similarly, where the device-to-device communications channel is to be established over Bluetooth™ the address information typically includes the 48-bit Bluetooth™ device address assigned to the respective devices 302, 304. Exchange of the public key information and address information of the respective devices is facilitated by the NOC 112 and the proxy server 120 as will now be described.

To achieve the exchange of address data and public key data, the secure applications 303, 305 running on the initiating device 302 and the receiving device 304 send their associated public key and address information to the proxy server using respective communication channels 308, 310. Communication channels 308, 310 are pre-established via the NOC 112 in the manner described above and are therefore authenticated and secure. Upon receipt of the public keys and address information from the initiating and receiving devices 302, 304, the proxy server 120 determines whether the computing devices 302, 304 are permitted to establish a secure device-to-device communications session. For example, the proxy server 120 may query a Global Address List (GAL) and/or a policy database 316 to determine whether the initiating user and the receiving user are permitted to establish the device-to-device communications channel and any restrictions on the data that is permitted to be exchanged (e.g. file type, file name, etc.). In some embodiments, the proxy server 120 may delegate this determination to the application server 122 associated with the secure applications 303, 305 running on the computing devices 302, 304 using communication channel 312. If it is determined that a secure device-to-device communication channel between the secure applications 303, 305 running on the computing devices 302, 304 is permitted, the proxy server 120 proceeds to send the public key data and address data for the initiating device 302 to the receiving device 304 over secure communication channel 310, and to send the public key data and address data for the receiving device 304 to the initiating device 302 over secure communication channel 308. Once this has data exchange has been completed, the secure applications 303, 305 use the received public key data and address data of the counterpart computing device to establish a secure device-to-device communication channel 314 for sending the enterprise information. This process is referred to herein as negotiation of a device-to-device communication channel.

It will be appreciated that negotiation of the device-to-device communication channel in this manner ensures that the public key data and the address data for the computing devices 302, 304 is exchanged over secure and authenticated communication channels established with the NOC 112 and the proxy server 120. Thus, it is not necessary to send information directly between the initiating device 302 and the receiving device 304 using an insecure communications channel, thereby avoiding the inherent security vulnerabilities associated with key exchange methods such as the Diffie-Hellman key exchange algorithm employed by some versions of the Bluetooth™ in its Secure Simple Pairing (SSP) process.

Figure 4:
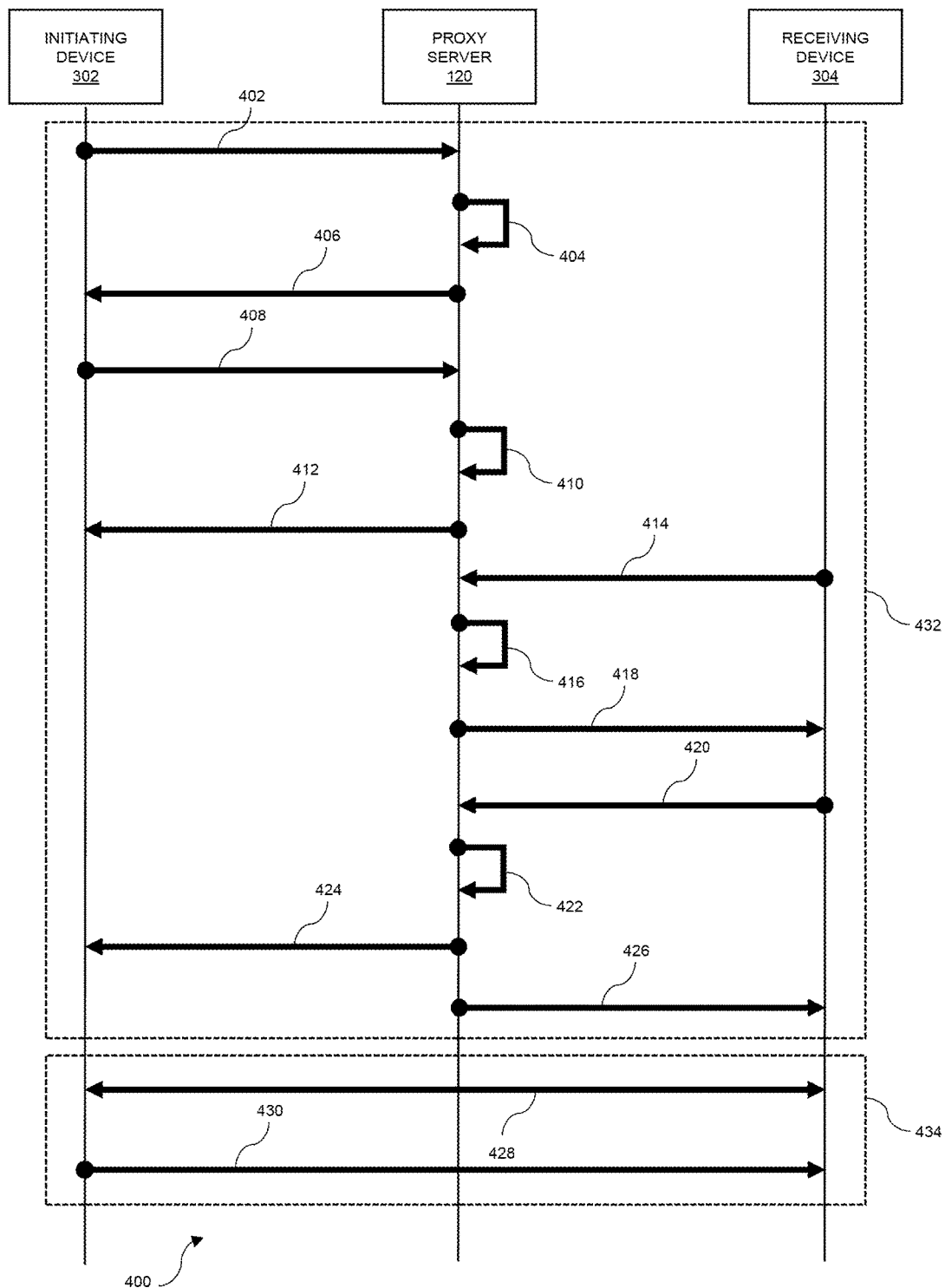
FIG. 4 is a signaling diagram showing a method of negotiating a device-to-device communications channel between a first computing device and a second computing device according to a "receptive mode" embodiment.

FIG. 4 is a signaling diagram showing a method 400 for negotiating a secure device-to-device communication channel between the secure applications 303, 305 running on the initiating device 302 and the receiving device 304 according to an embodiment. Specifically, the method of FIG. 4 is an example of a "receptive mode" for establishing a device-to-device connection between the computing devices 302, 304 shown in FIG. 3.

Before initiating the device-to-device communications channel, the initiating user informs the receiving user that they wish to share enterprise data, such as a confidential presentation. If the receiving user agrees to receive the confidential presentation, they provide the initiating user with an identifier which uniquely identifies the receiving user to the enterprise (e.g. the receiving user's enterprise e-mail address or username). Typically, the receiving user informs the initiating user of the unique identifier verbally, but it will be appreciated that the unique identifier may alternatively be exchanged electronically using a secure Web portal, Instant Messaging, a QR code, or similar.

Next, the initiating user uses the secure application 303 running on the initiating device 302 to perform a lookup operation using the unique identifier provided by the receiving user. Typically, the secure application 303 running on the initiating device 302 sends a lookup request, including the unique identifier for the receiving user, to the proxy server 120 using secure communication channel 308 (step 402). Upon receipt of the lookup request, the proxy server 120 queries the GAL using the identifier and retrieves information regarding the receiving user (step 404) which it returns to the secure application 303 running on the initiating device 302 over secure communication channel 308 (step 406). The information returned by the proxy server 120 may, for example, include the receiving user's full name, job title and/or identification photograph, etc. Upon receipt of the information relating to the receiving user, the secure application 303 running on the initiating device 302 displays the information for review by the initiating user. The initiating user reviews the information, for example to determine whether the receiving user matches his or her identification photograph, and selects whether they wish to proceed with establishment of the secure device-to-device communications channel.

If the initiating user confirms that they wish to proceed, the secure application 303 running on the initiating device 304 generates and sends a connection request to the proxy server 120 via secure communications channel 308 (step 408). Typically, this connection request includes capability information and cryptographic information for use in establishing the secure device-to-device communications channel. The capability information indicates one or more communication interfaces or media available to the initiating device 302 for establishing the device-to-device communications channel (e.g. Bluetooth™ and/or NFC etc.) and the associated addressing information as discussed above. This information may be retrieved from an operating system running on the initiating device 302 (e.g. via an Application Programming Interface (API)), or pre-configured within the secure application 303 (e.g. in accordance with a policy set by an administrator of the enterprise network). The cryptographic information typically includes a public key associated with a public-private key pair generated by secure application 303 for the purpose of securing the device-to-device communications channel. As discussed above in relation to FIG. 3, the public-private key pair is typically generated on a per-connection basis using a public key algorithm, thereby ensuring that each device-to-device connection is established using a different public-private key pair and preventing potential eavesdropping by unauthorized parties. In some embodiments the connection request also includes an identifier for the initiating user which uniquely identifies them to the enterprise (e.g. the initiating user's enterprise e-mail address or username), together with the identifier for the receiving user. Alternatively or additionally, the proxy server 120 may retain some or all of this information from step 402 in respect of a particular session with the initiating device 302, thereby avoiding the need for the information to be sent again at step 408.

Upon receipt of the connection request from the secure application 303 running on the initiating device 302, the proxy server 120 registers the request as a pending connection request (step 410) and optionally returns an acknowledgement to the initiating device 302 (step 412). Upon receipt of the acknowledgement, the initiating user informs the receiving user that a connection request is pending and provides the receiving user with the identifier for the initiating user. Next, the receiving user opens the secure application 305 running on the receiving device 304 and performs a lookup operation using the identifier for the initiating user. The secure application 305 sends a lookup request, including the identifier for the initiating user to the proxy server 120 using secure communication channel 310 (step 414). Upon receipt of the lookup request, the proxy server 120 queries the GAL using the identifier and retrieves information regarding the initiating user (step 416) which it returns to the secure application 305 over secure and authenticated communication channel 310 (step 418). The information returned by the proxy server may, for example, include the initiating user's full name, job title and/or identification photograph, etc. Upon receipt of this information, the secure application 305 running on the receiving device 304 displays the information for review by the receiving user. The receiving user reviews the information, for example to determine whether the initiating user matches their identification photograph, and confirms whether they want to proceed with establishment of the secure device-to-device communications channel.

If the receiving user confirms that they wish to proceed, the secure application 305 generates a complementary connection request which is sent to the proxy server 120 using secure communications channel 310 (step 420). Similar to the connection request sent at step 408, the complementary connection request includes capability information and cryptographic information for the receiving device 304. The capability information indicates one or more communication interfaces or media over which the receiving device is able or willing to establish the device-to-device connection and appropriate addressing information for the indicated interfaces or media as discussed above. The cryptographic information typically includes a public key associated with a public-private key pair generated by secure application 305 for the purpose of securing the device-to-device communications session. As discussed above, the public-private key pair is typically generated by the secure application 305 on a per-connection basis using a public key algorithm. In some embodiments the complementary connection request also includes the identifiers associated with the initiating user and the receiving user, or alternatively, the proxy server 120 may retain some or all of this information from step 414 in respect of a particular session with the receiving device 304, thereby avoiding the need to it to be sent again at step 420.

Upon receipt of the complementary connection request, the proxy server 120 determines that the initiating device 302 and the receiving device 304 wish to establish a device-to-device communications channel. For example, the proxy server 120 may perform a lookup or correlation operation, based on one or both of the identifiers associated with the initiating and receiving users, to "match" the connection request received from the secure application 303 running on the initiating device 302 with the complementary connection request received from the secure application 305 running on the receiving device 304 (step 422). At this stage, it will be appreciated that the proxy server 120 has determined that the secure applications 303, 305 running on the initiating and receiving devices 302, 304 wish to establish a secure device-to-device communications channel, and is also in receipt of capability information, address information and cryptographic information for both the initiating device 302 and the receiving device 304. Thus, the proxy server 120 proceeds to send appropriate connection data to the secure application 303 running on the initiating device 302 and the secure application 305 running on the receiving device 304 to enable the secure device-to-device communications channel to be established (steps 424 and 426). More specifically, the connection data sent to the initiating device 302 at step 424 includes the addressing information and cryptographic information received from the receiving device 304, and the connection information sent to the receiving device 304 at step 426 includes the addressing information and cryptographic information received from the initiating device 302.

Where the capability information received at the proxy server 120 from one or both of the initiating device 302 and the receiving device 304 indicate more than one communication interface of medium available for establishing the device-to-device communications channel, the proxy server 120 may be configured to determine one or more "common" communication interfaces which were indicated as available or acceptable to both devices 302, 304. In this case, the connection information sent from the proxy server 120 will only include relevant address information for the determined "common" communication interfaces. For example, if the connection request received from initiating device 302 indicates Bluetooth™ and NFC as available interfaces but the connection request received from the receiving device 304 indicates only Bluetooth™, the connection data sent from the proxy server 120 in steps 424 and 426 will include address information for initiating the secure device-to-device communications channel using Bluetooth™ only. Similarly, where the capability information indicates more than one common communication interfaces, the proxy server 120 may send address information for each of the common interfaces, thereby enabling selection by the initiating and receiving users. In this case, the initiating and receiving users may negotiate which communication interface to use verbally, or a negotiation process may be facilitated electronically by the proxy server 120 over secure and authenticated communication channels 308, 310. In the event that the connection requests from the initiating device 302 and receiving devices 304 do not indicate a common or mutually acceptable communication interface, such that a device-to-device communications channel cannot be established, the proxy server 120 sends a notification to this effect to the secure applications 303, 305 running on the devices 302, 304 (not shown) and the process is terminated.

Once the connection information has been sent to the initiating and receiving devices 302, 304 at steps 424 and 426 respectively, the secure applications running on each device may display a prompt to their respective users requesting confirmation that they wish to proceed with establishment of a secure device-to-device communications channel. For example, the secure application running on the initiating device 302 may display a prompt such as "Press OK if you wish to proceed with securely sending data "presentation.pptx" to user B using a secure channel established over Bluetooth™", whereas the secure application running on the receiving device 302 may display a prompt such as "Press OK if you wish to proceed with securely receiving data "presentation.pptx" from user B using a secure channel established over Bluetooth™". Once the initiating and receiving users have confirmed that they wish to proceed with establishment of the secure device-to-device communication channel, the respective secure applications 303, 305 access the appropriate interfaces (e.g. local interface 216) in the respective devices 302, 304 to establish the connection using the received address data and to send exchange the enterprise data securely using the received cryptographic data. In other words, the secure application 303 running on the initiating device 302 encrypts data to be sent over the device-to-device communications channel using the public key generated by the secure application 305 running on the receiving device 304 (received from the proxy server 120 at step 424), and the secure application 305 running on the receiving device 304 encrypts data to be sent over the device-to-device communications channel using the public key generated by the secure application 303 running on the initiating device 302 (received from the proxy server 120 at step 426).

It will be appreciated that all interactions between the initiating device 302 and the proxy server 120, and the receiving device 304 and the proxy server 120, are performed over communication channels 308, 310 (indicated by 432 in FIG. 4) which are secured and authenticated (e.g. via the NOC). These interactions are typically performed at least in part of the Internet and utilize the network interfaces 214 of the initiating and receiving devices 302, 304. In contrast, the direct interactions between the initiating device 302 and the receiving device 304 are typically performed over an ad-hoc connection established using the local interfaces 216 of the initiating and receiving devices 302, 304 (indicated by 434 in FIG. 4).

Figure 5:
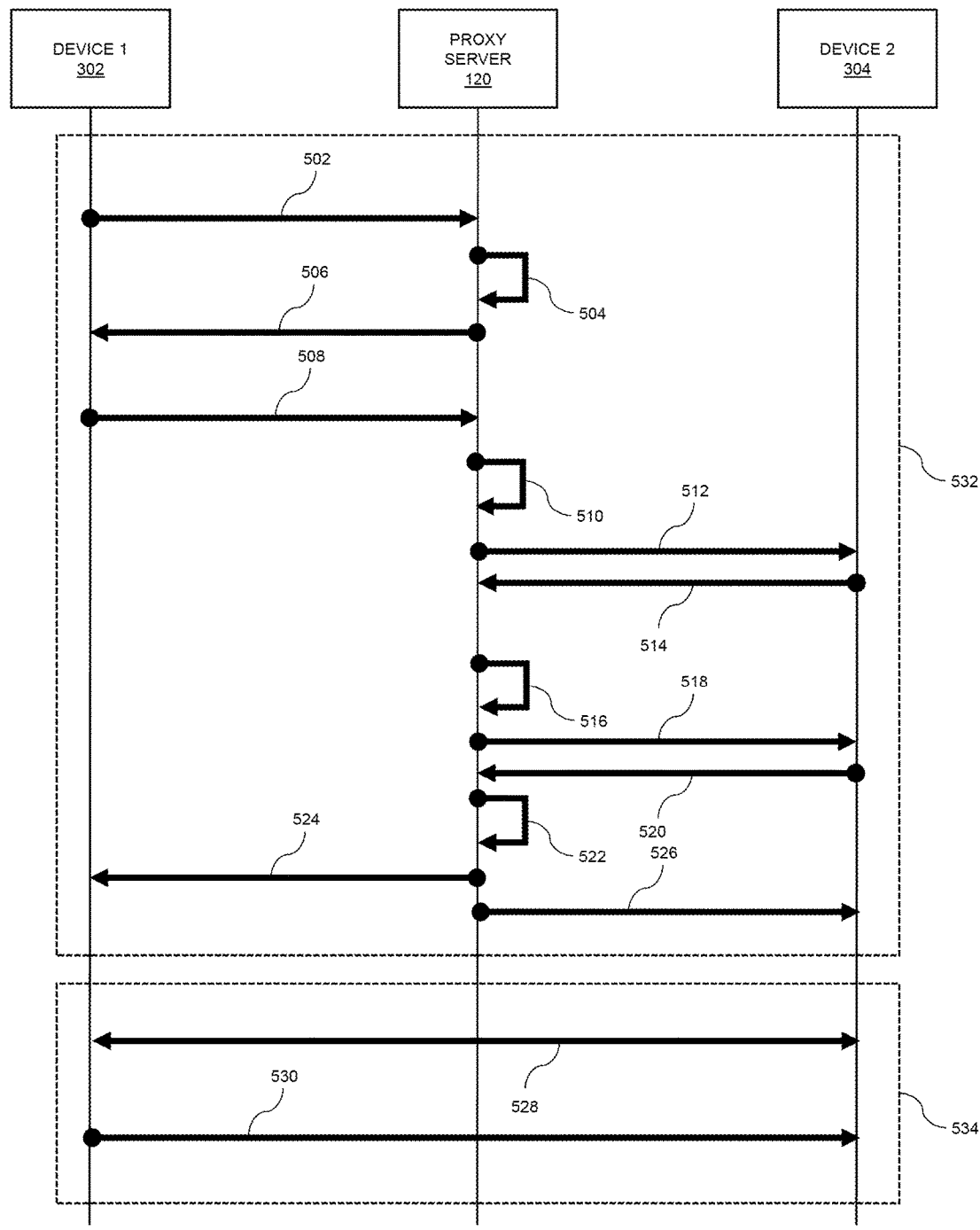
FIG. 5 is a signaling diagram showing a method of negotiating a device-to-device communications channel between a first computing device and a second computing device according to a "challenge mode" embodiment.

FIG. 5 is a signaling diagram showing a method 500 of negotiating a secure device-to-device communication channel between the initiating device 302 and the receiving device 304 according to a further embodiment. Specifically, the method of FIG. 5 is an example of a "challenge mode" for establishing a device-to-device connection between the computing devices 302, 304 shown in FIG. 3.

First, the initiating user and the receiving user agree upon a challenge, such as a PIN or password, to identify the request to establish a secure device-to-device communications session. Typically, the challenge is agreed by the initiating and receiving users "out of band" (e.g. by means of a verbal exchange) but in some embodiments the challenge may be exchanged by means of a QR code or similar, using functionality provided by the secure applications 303, 305. In some embodiments, the QR code is also used to send an identifier which uniquely identifies the receiving user to the enterprise (e.g. the receiving user's enterprise e-mail address or username) from the secure application 305 running on the receiving device 304 to the secure application 303 running on the initiating device 302. In further embodiments, the secure application running on the initiating computing device 302 or the receiving computing device 304 may generate the challenge using, for example, a pseudo random number generator, and encode the generated challenge in the QR or similar.

Once the challenge has been agreed and exchanged, the secure application 303 running on the initiating device 302 generates and sends a lookup request based on the identifier for the receiving user to the proxy server 120 using secure communications channel 308 (step 502). Upon receipt of the lookup request, the proxy server 120 queries the GAL using the identifier and retrieves information regarding the receiving user (step 504), which it returns to the secure application 303 running on the initiating device 302 (step 506). As explained above in relation to the "challenge mode" of FIG. 4, the information may, for example, include the receiving user's full name, job title and/or identification photograph, etc. Upon receipt of this information, the secure application 303 running on the initiating device 302 displays the information for review by the initiating user. The initiating user reviews the information, for example to confirm that the receiving user matches their identification photograph, and confirms that they wish to proceed with establishment of the secure device-to-device communications channel.

Upon receiving confirmation that the initiating user wishes to proceed, the secure application 303 generates and sends a connection request to the proxy server 120 via secure communications channel 308 (step 508). Typically, this connection request includes the challenge agreed between the initiating and receiving users, and capability information and cryptographic information for use in establishing the secure device-to-device communications channel. The capability information indicates one or more communication technologies or media available to the initiating device 302 for establishing the device-to-device communications channel (e.g. Bluetooth™ and/or NFC etc.) and the associated addressing information as discussed above. The cryptographic information typically includes a public key of a public-private key pair generated by secure application running on the initiating device 302 for the purpose of securing the device-to-device communications session. As discussed above in relation to FIGS. 3 and 4, generally speaking, the public-private key pair is generated on a per-connection basis using a public key algorithm, as is known in the art. In this manner, each device-to-device connection is established using a different public-private key pair, thus preventing eavesdropping by unauthorized parties. In some embodiments the connection request also includes an identifier which uniquely identifies the initiating user to the enterprise (e.g. the initiating user's enterprise e-mail address or username) and the identifier previously received for the receiving user. Alternatively, the proxy server 120 may retain some or all of this information from step 502 in respect of a particular session with the initiating device 302, thereby avoiding the need to it to be sent again at step 508.

Upon receipt of the connection request, the proxy server 120 registers the request as a pending connection request in associated with the received challenge, and optionally returns an acknowledgement to the initiating device (not shown). Once the connection request has been registered, the proxy server 120 performs a GAL operation to identify all registered devices associated with the receiving user based on their associated identifier (step 510). Typically, the receiving user may be registered with several computing devices, such as a smart phone, a tablet computer and/or a laptop computer, etc. Once the proxy server 120 has identified the computing devices associated with the receiving user, it proceeds to generate and send a push notification identifying the pending connection request (e.g. sent via the push server 126 of the NOC 112) to secure applications installed on each of the identified devices (step 512). In the present example, the devices associated with the receiving user as identified by the proxy server 120 includes receiving device 304. Typically, the push notification received by the secure application 305 running on the receiving device 304 includes, for example, a unique identifier for the initiating user (e.g. their enterprise e-mail address or username), their full name and/or their identification photograph, etc. Upon receipt of the information regarding the initiating user at the receiving device, the secure application 305 running on the receiving device 304 displays the information for review by the receiving user. The initiating user reviews the information, for example to confirm that the receiving user matches their identification photograph, and confirms that they wish to proceed with establishment of the secure device-to-device communications channel by entering the challenge agreed between the initiating and receiving parties.

Responsive to input of the challenge agreed between the initiating and receiving parties, the secure application 305 generates and sends a message to the proxy server 120 which includes the challenge using secure communications channel 310 (step 514). The proxy server 120 compares the challenge received from the receiving device at step 514 with the challenge received from the initiating device at step 508 to determine whether they match (step 516). This comparison step ensures that the user of the receiving device 304 is indeed the user with which the challenge was originally agreed, and prevents an unauthorized user in possession of one of the devices identified at step 510 from establishing a device-to-device communication channel without permission. If the proxy server 120 determines a match at step 516 it sends an appropriate notification to the secure application 305 running on the receiving device 304 (step 518). Responsive to receipt of this notification, the secure application 305 generates a complementary connection request which is also sent to the proxy server using secure communications channel 310 (step 520). The complementary connection request includes capability information and cryptographic information. As discussed above in relation to FIG. 4, the capability information indicates one or more communication technologies or media over which the secure application 305 running on the receiving device 304 is able or willing to establish the device-to-device connection, and appropriate address information. The cryptographic information typically includes a public key of a public-private key pair generated by the secure application 305 running on the receiving device 304 and for use in securing the device-to-device communications channel.

Upon receipt of the complementary connection request, the proxy server 120 determines that the secure application 303 running on the initiating device 302 and the secure application 305 running on the receiving device 304 wish to establish a device-to-device communications channel, and proceeds to send appropriate connection data to enable the secure device-to-device communications channel to be established (steps 524 and 526). More specifically, the connection data sent to the secure application 303 running on the initiating device 302 at step 524 includes the addressing information and cryptographic information associated with the receiving device 304, and the connection information sent to the secure application 305 running on the receiving device 304 at step 526 includes the addressing information and cryptographic information associated with the initiating device 302.

Once the connection information has been sent to the initiating and receiving devices 302, 304 at steps 524 and 526 respectively, the secure applications running on each device may display a prompt to their respective users requesting confirmation that they wish to proceed with establishment of a secure device-to-device communications channel in the manner described above in relation to FIG. 4. Once the initiating and receiving users have confirmed that they wish to proceed with establishment of the secure device-to-device communication channel, the respective secure applications 303, 305 access the appropriate interfaces (e.g. local interface 216) in the respective devices 302, 304 to establish the connection using the received address data (step 528) and exchange the enterprise data securely using the received cryptographic data (step 530). In other words, the secure application 303 running on the initiating device 302 encrypts data to be sent over the device-to-device communications channel using the public key generated by the secure application 305 running on the receiving device 304 (received from the proxy server 120 at step 524), and the secure application 305 running on the receiving device 304 encrypts data to be sent over the device-to-device communications channel using the public key generated by the secure application 303 running on the initiating device 302 (received from the proxy server 120 at step 526).

In some embodiments, the connection request sent from the secure application 303 running on the initiating device 302 includes an indication of the enterprise data to be sent to the receiving device over the requested secure device-to-device communication channel. Based on this indication, the proxy server 120 is able to determine whether transfer of the enterprise data is allowed, and whether to permit establishment of a secure device-to-device communications channel between the initiating 302 and receiving devices 304. This determination may be delegated to the application server 122, which typically stores and manages access policies in respect of the enterprise data stored in or by the secure applications 303, 305 running on the initiating and receiving devices 302, 304. For example, responsive to receipt of a connection request indicating that the initiating user wishes to share a file named "presentation.pptx", the proxy server 120 may send a policy query to the application server 122 indicating the identity of the initiating user, the identity of the receiving user, and the enterprise data to be exchanged. If the application server 122 responds by indicating that such an exchange is permitted, the proxy server 120 proceeds to negotiate the device-to-device connection in the manner described above with respect to FIG. 4 or FIG. 5. Conversely, if the application server 122 responds by indicating that the exchange is not permitted, the proxy server 120 may terminate the negotiation process and inform the secure application 303 running on the initiating device 302 as appropriate.

In further embodiments, the application server 122 may respond to the policy query from the proxy server 120 by returning one or more rules in respect of the enterprise data to be exchanged. For example, the one or more rules may specify that the exchange between the initiating device 302 and the receiving device 304 is permitted but that the connection must be established within a particular time period (e.g. ten minutes) or using a particular communication interface or medium (e.g. Bluetooth™). Moreover, the one or more rules may specify restrictions on the use of the enterprise data once received by the receiving device 304. For example, the one or more rules may specify that the enterprise data may be displayed by the secure application 305 running on the receiving device 304, but that is not permitted to edit, print, copy or send the enterprise data to a further user. If the application server 122 responds with one or more rules in this manner, the proxy server 120 will include the rules, or a subset thereof, in the connection data that it sends to the secure applications 303, 305 (e.g. steps 424 and/or 426 of FIG. 4 and steps 524 and/or 526 of FIG. 5). In turn, the secure applications 303, 305 are configured to enforce any rules received in the connection data from the proxy server 120 to ensure that the enterprise data is managed in accordance with the policies maintained by the application server 122.

In some embodiments, the application server 122 may be configured to keep a record (e.g. in a database) of which secure applications have received the enterprise data and, if a respective policy is changed or updated by an administrator, to push any new or modified rules to those secure applications. Thus, in this manner the applications server 122 may track the dissemination of the enterprise data and ensure that it is managed according to policy on all relevant devices.

Figure 6:
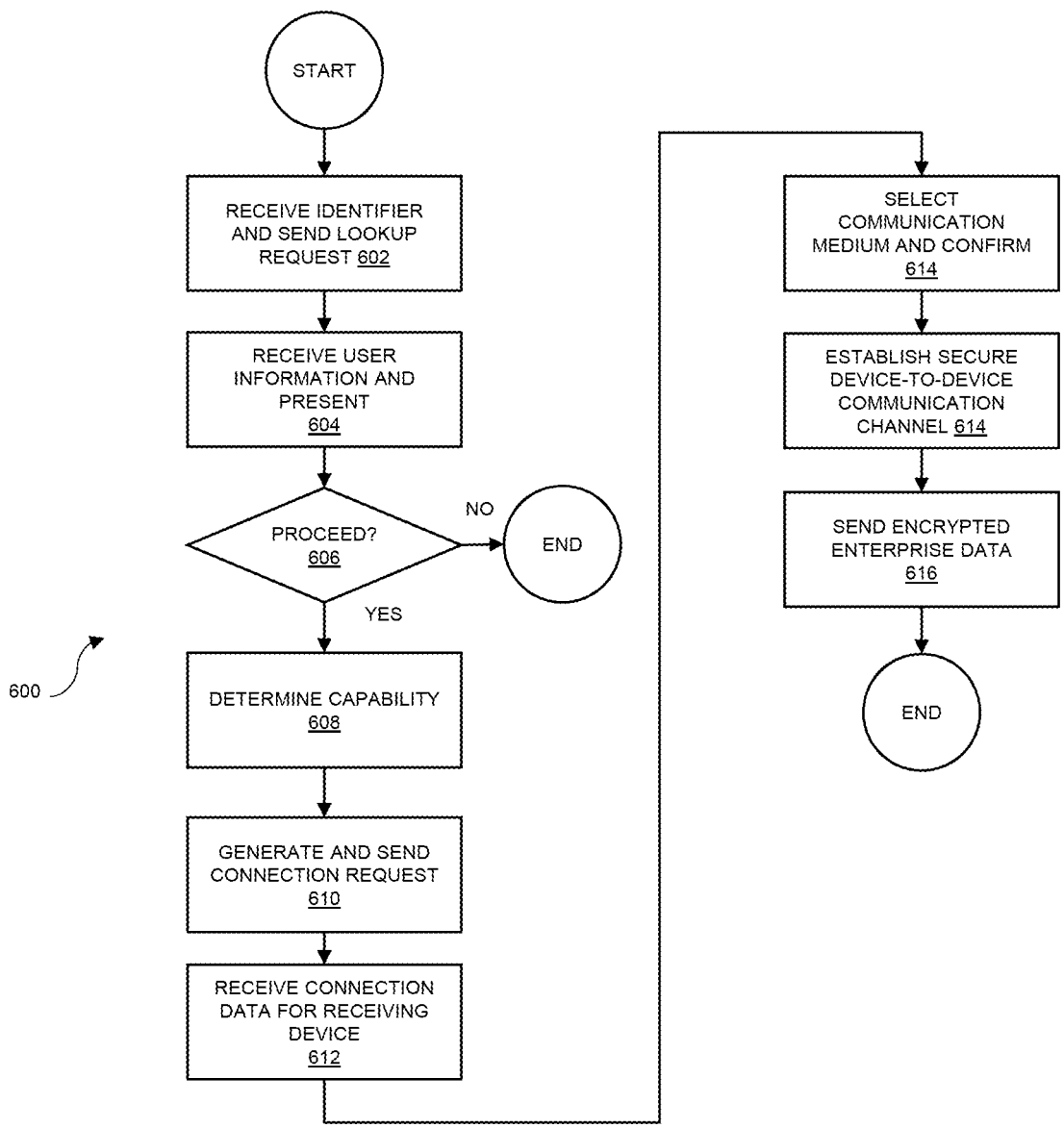
FIG. 6 is a flow diagram showing a method performed by a computing device of initiating a device-to-device communications channel between the computing device and a further computing device according to an embodiment.

The methods 400, 500 discussed above with reference to FIGS. 4 and 5 are shown from the perspective of the initiating device 302 in FIG. 6. Specifically, FIG. 6 shows a method 600 performed by the secure application 303 running on initiating device 302 for initiating a secure device-to-device communications channel between with the receiving device 304 according to an embodiment. In a first step, the secure application 303 receives the identifier associated with the receiving user and sends a lookup request including the identifier to the proxy server 120 over the secure communications channel 308 (step 602). Next, the secure application 303 receives information associated with the receiving user from the proxy server 120 and displays it to the initiating user for confirmation (step 604). The secure application 303 receives an input from the initiating user as to whether they wish to proceed with establishing the secure device-to-device communication channel (step 606). If the input indicates that the initiating user wishes to terminate the connection request ("no" at step 606) the method is terminated. Conversely, if the input indicates that the initiating user wishes to proceed with the connection request ("yes" at step 606), the secure application 303 proceeds to determine which interfaces are available for establishment of the device-to-device communications channel (step 608). As discussed above, such a determination may involve aspects of the operating system running on the initiating device, and/or may involve displaying a list of available interfaces for selection by the initiating user. Next, the secure application generates a connection request, including capability data and cryptographic data in the manner described above with reference to FIGS. 4 and 5, and sends the connection request to the proxy server 120 over the secure communication channel 308 (step 610). Typically, the connection request generated at step 610 will indicate whether the device-to-device communications channel is to be established according to the "receptive mode" or "challenge mode" methods discussed above with reference to FIGS. 4 and 5, and, in the latter case, the connection request will include the challenge agreed between the initiating and receiving users. Following this, the secure application 303 receives, from the proxy server 120, the connection data associated with the receiving device 304 (step 612) and, if the connection data associated with the receiving device 304 indicates several available or acceptable interfaces for establishment of the device-to-device communications channel, the secure application 303 displays a list of the interfaces to the initiating user for selection (step 614). Once the interface for the device-to-device communications channel has been selected or otherwise determined, the secure application 303 establishes a secure device-to-device communication channel with the secure application 305 running on the receiving device 304 using the received connection data (step 614), and proceeds to send the enterprise data over the established device-to-device connection in encrypted format (step 616). Once the enterprise data has been sent, the secure device-to-device communications channel may be terminated immediately, or after a predetermined time period.

Figure 7:
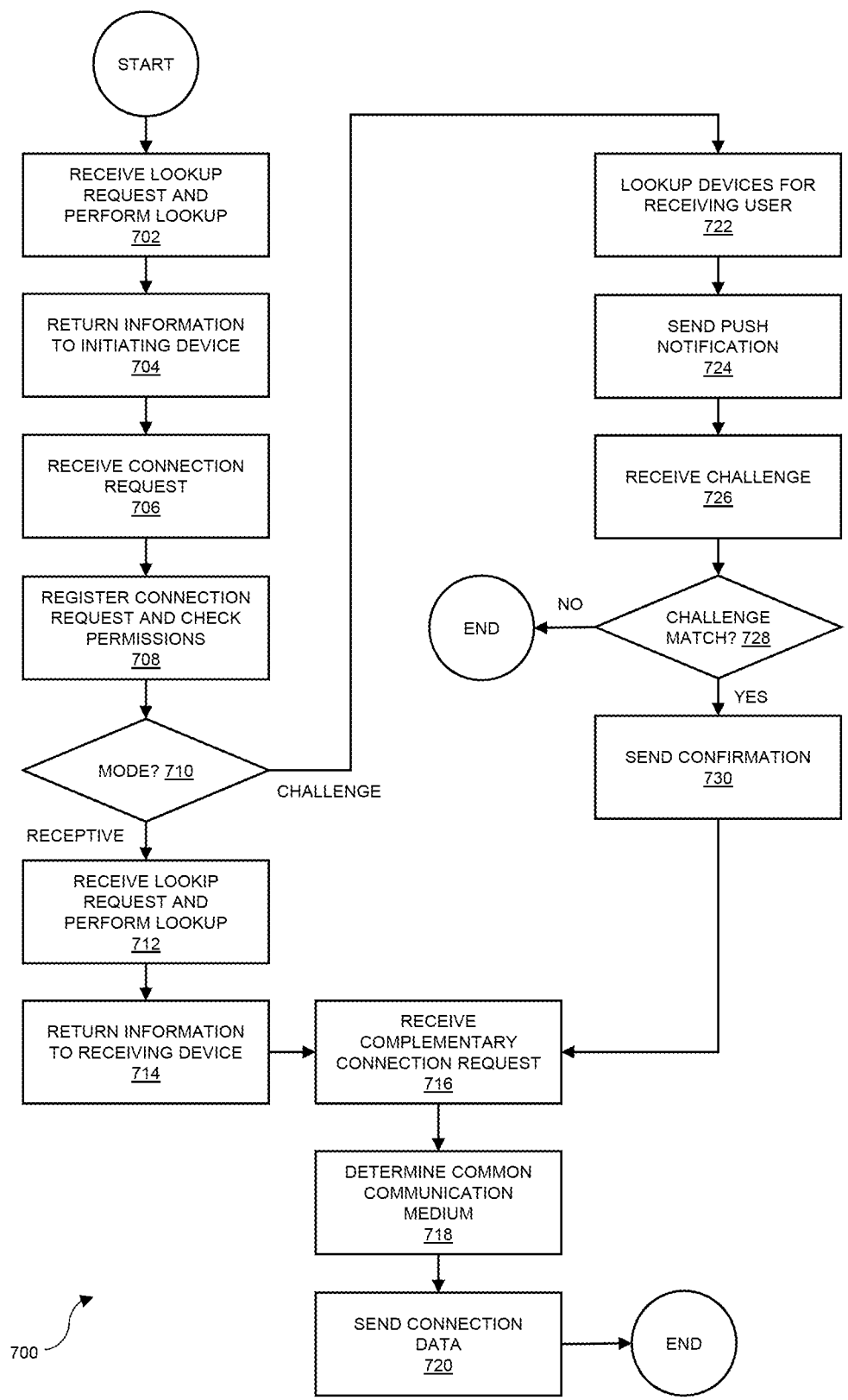
FIG. 7 is a flow diagram showing a method performed by a server for negotiating a device-to-device communications channel between a first computing device and a second computing device according to an embodiment.

FIG. 7 shows a method 700 performed by the proxy server 120 for negotiating a secure device-to-device communications channel between the initiating device 302 and the receiving device 304 according to an embodiment. In a first step, the proxy server 120 receives a lookup request from the secure application 303 running on the initiating device 302 and, in response, the proxy server 120 retrieves information regarding the receiving user (step 702) which it returns to the secure application 303 over the secure communications channel 308 (step 704). If the initiating user decides to proceed with the connection request based on the information regarding the receiving user, the proxy server receives a connection request from the secure application 303 running on the initiating device 302 (step 706). Responsive to receipt of the connection request, the proxy server 120 registers a pending connection request and performs one or more checks to determine whether the requested connection is permitted, as discussed above with reference to FIGS. 4 and 5 (step 708). Next, the proxy server 120 determines whether the device-to-device communications channel is to be established according to the "receptive mode" or "challenge mode" methods discussed above with reference to FIGS. 4 and 5 (step 710). For example, the proxy server 120 may determine whether the connection request received at step 706 includes a challenge (agreed by the initiating user and receiving user), thus indicating that the "challenge mode" is to be followed.

If, at step 710, it is identified that the "receptive mode" is to be followed, the proxy server waits to receive a lookup request from the secure application 305 running on the receiving device 304 and, on receipt of the connection request, retrieves the information regarding the initiating user (step 712) and returns it to the secure application 305 (step 714). Next, the proxy server 120 receives the complementary connection request from the secure application 305 running on the receiving device (step 716) and, based on the included capability data, determines one or more common communication interfaces for establishing the device-to-device communications channels (step 718). Finally, the proxy server 120 generates and sends connection data necessary to establish the secure device-to-device communications channel to the secure applications 303, 305 in the manner described above with reference to FIGS. 4 and 5 (step 720).

If, at step 710, it is identified that the "challenge mode" is to be followed, the proxy server proceeds to perform a lookup operation to identify one or more devices associated with the receiving user (step 722). Next, the proxy server 120 generates and sends a push notification to the secure applications running on each of the identified devices (step 724). Subsequently, the proxy server 120 receives a response including a challenge from the secure application 305 running on the receiving device 304 (step 726) and compares the challenge to the challenge received in the connection request from the secure application 303 running on the initiating device 302 at step 706. If the respective challenges match, the proxy server 120 sends confirmation to the secure application 305 running on the receiving device 304 (step 730) and subsequently receives the complementary connection request from the secure application 305 (step 716); the method then proceeds according to steps 718 and 720 as described above in relation to the "receptive mode".

Various aspects of the methods described hereinbefore with reference to FIGS. 4 to 7 involve interactions between the users and the secure applications 303, 305 running on their associated devices. Typically, these interactions are facilitated by one or more Graphical User Interfaces (GUIs) which are provided by the secure applications 303, 305. The one or more GUIs provide functionality that enables the secure applications 303, 305 to display information and prompts to the users, and also to receive user input via the screen 202 (in the case of a touchscreen), a keyboard or other suitable input device. Additionally or alternatively, the secure applications 303, 305 may interact with the users using a voice or audio based interface, using techniques which are known in the art.

It will be appreciated that at least parts of the methods discussed above with reference to FIGS. 4 to 7 may be implemented using software instructions stored on a computer useable storage medium for execution by a computing device. As an example, an embodiment of a computer program product includes a computer useable storage medium to store a computer readable program that, when executed on a computing device, causes the computing device to perform operations, as described hereinbefore. Furthermore, embodiments of the invention can be embodied in the form of a computer program product accessible from a computer-usable or computer-readable medium providing program code for use by or in connection with a computing device or any instruction execution system. For the purposes of this description, a computer-usable or computer-readable medium can be any apparatus that can contain, store, communicate, propagate, or transport the program for use by or in connection with the instruction execution system, apparatus, or device. The apparatus may be a transitory or a non-transitory computer-readable medium. For example, the computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital versatile disk (DVD).

Figure 8:
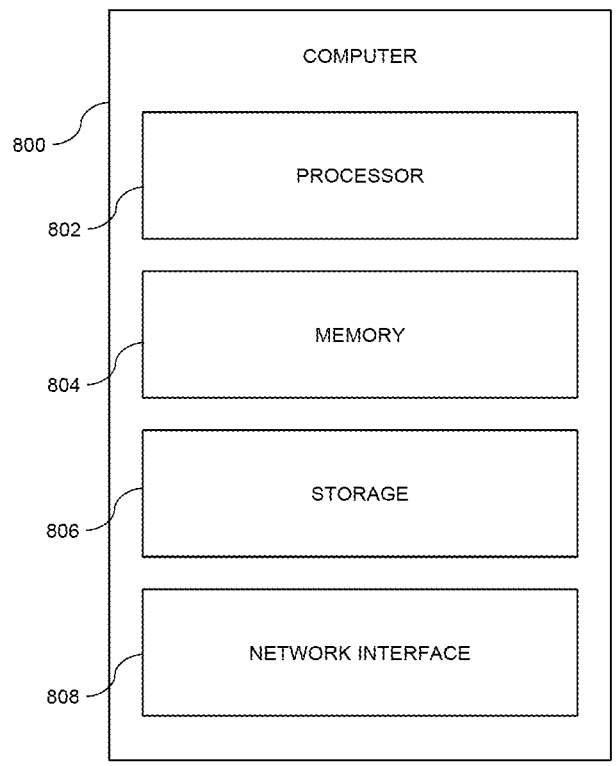
FIG. 8 is a schematic diagram showing a proxy server according to an embodiment.

Embodiments of the proxy server 120 described above with reference to FIGS. 1 to 7 is typically performed by a computer that executes computer readable instructions. FIG. 8 depicts schematically an example of a suitable computer 800 that includes a processor 802, a memory 804, a storage device 806 and a network interface 808. The processor 802 may include a multifunction processor and/or an application-specific processor, examples of which include the PowerPC™ family of processors by IBM™ and the x86 and x86-64 family of processors by Intel™. The memory 804 within the computer is typically RAM and storage device 806 is typically a large capacity permanent storage device such as a magnetic hard disk drive or solid state memory device. The network interface 808 enables communications with other computers in a network using as suitable protocol, such as the Internet Protocol (IP) and the processor 802 executes computer readable instructions stored in storage 806 to implement embodiments of the invention as described hereinbefore.

Whilst the embodiments described hereinbefore relate to secure device-to-device communication channel for exchange of enterprise data from an initiating device to a receiving device, it will be appreciated that the established communications channel may also be used to provide secure access to one or more services hosted by the secure applications running on the devices. Thus, it will be appreciated that the above embodiments are not restricted to a particular type of enterprise data but instead encompass any type of data or service provided or managed by the secure applications.

Moreover, although the above embodiments relate to a secure communications channel established between an initiating device and a receiving device (i.e. in a client-server arrangement), it will be understood that further embodiments may invoice more than two devices. For example, further embodiments may relate to an initiating device establishing several secure device-to-device communication channels to several respective receiving devices, for example, to implement a peer-to-peer network or Personal Area Network (PAN).

Much of the above description is in terms of secure communication channels and the like. Typically, the secure communication channels may be established using HTTPS over TCP and/or SSL or other secure protocols that are known in the art. Alternatively, proprietary protocols may be used, such as the Good Relay Protocol (GRP) developed by Good Technology™ of Sunnyvale, Calif., United States.

It will be further appreciated that some or all of the functionality provided by the proxy server 120 in the embodiments described hereinbefore may also be provided by one or more of the other servers in the NOC 112 and/or the enterprise network 116. For example, where it is desired to negotiate the secure device-to-device communications channel with minimal time delay, some of the functionality provided by the proxy server 120 may be delegated to a server in the NOC 112. Such delegation may be advantageous in situations where it is deemed unnecessary to check user permissions (e.g. by reference to the application server 122), thereby obviating the need to route connection requests via the enterprise network 116 and enabling the device-to-device communication channel to be negotiated with minimal time delay.

The above embodiments are to be understood as illustrative examples of the invention. Further embodiments of the invention are envisaged. For example, whilst much of the above description is in terms of "enterprise" servers and data providing enterprise services for users, embodiments of the present invention are widely applicable to many scenarios where two or more users establish a secure device-to-device communications channel to exchange data or services. For example, the methods described above may be used to establish a secure communications channel between devices of users associated with different enterprises; in this case, the functionality relating to the negotiation of secure device-to-device communications described above may be provided by the NOC 112, as described above, or by another server. In the case of communications between users associated with different enterprises, it may be particularly advantageous to use the challenge mode described above in order to establish a trust relationship between the parties.

A secure communications channel according to the methods and systems described herein may be used to transmit data in the discovery and/or delegation of services in systems in which services are delegated from an application on one device to an application on another device, for example as described in WO2014/014879. For example, a document viewing application on one device may delegate printing of a document to a printing application on another device; an application cryptography may provide a service for decrypting data (or example, e-mail data) on behalf of another application (for example, an e-mail application); or an application on one device may delegate a document or video viewing service to an application on one or more other devices, in order to share information with the user or users of same. For example, a communications channel may be established according to the challenge mode described above, in order that services available for delegation by an application on one device may be discovered by an application on another device.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of negotiating a secure device-to-device communications channel between a first computing device and a second computing device, the first computing device being associated with a first user and the second computing device being associated with a second user, the method comprising:
   receiving, at a server, a first connection request comprising first address data and a first cryptographic key associated with a first computing device, the first connection request being received over a first secure communications channel;
   receiving, at the server, a second connection request comprising second address data and a second cryptographic key associated with a second computing device, the second connection request being received over a second secure communications channel; and
   determining, on the basis of an identity of the first user and an identity of the second user, that the secure device-to-device communication channel is permitted and, dependent on a determination that the secure device-to-device communication channel is permitted:
      sending, from the server, first connection data to the first computing device over the first secure communications channel; and
      sending, from the server, second connection data to the second computing device over the second secure communications channel; and
      wherein the first connection data comprises the second address data and second cryptographic key, and the second connection data comprises the first address data and first cryptographic key, the first and second connection data being for use in enabling establishment of a secure device-to-device communications channel between the first computing device and the second computing device.

2. The method according to claim 1, comprising establishing a direct secure device-to-device communications channel between the first computing device and the second computing device using the first connection data and the second connection data.

3. The method according to claim 1, wherein the first connection request comprises an indication of the second user, and the method comprises, responsive to receipt of the first connection request, sending a connection notification indicative of a pending connection request to one or more computing devices associated with the second user, wherein the one or more computing devices includes the second computing device.

4. The method according to claim 3, comprising determining the one or more computing devices associated with the second user using the indication of the second user in the first connection request.

5. The method according to claim 3, wherein the second connection request is sent to the server by the second computing device responsive to receipt of the connection notification at the second computing device.

6. The method according to claim 1, wherein the first connection request comprises a first session identifier and the second connection request includes a second session identifier, and wherein the sending of the first connection data and the sending of the second connection data is conditional on the first session identifier corresponding to the second session identifier.

7. The method according to claim 6, wherein the first session identifier and the second session identifier correspond to a user identity associated with the first computing device or the second computing device.

8. The method according to claim 6, wherein the first session identifier and the second session identifier correspond to a predetermined challenge exchanged between the first computing device and the second computing device prior to receipt of the first connection request and the second connection request.

9. The method according to claim 1, wherein the first connection request indicates an intended use of the secure device-to-device communications channel.

10. The method according to claim 1, wherein the first connection request identifies data to be transferred from the first computing device to the second computing device using the secure device-to-device communications channel.

11. The method according to claim 1, wherein the first connection request indicates a specified service running on the first computing device to be shared with the second computing device using the secure device-to-device communications channel.

12. The method according to claim 9, wherein sending the first connection data and the second connection data is dependent on a determination that the secure device-to-device communications channel is permitted on the basis of the intended use of the secure device-to-device communications channel.

13. The method according to claim 1, comprising retrieving, at the server, permission data associated with the first user and the second user, wherein the determination that the secure device-to-device communications channel between the first computing device and the second computing device is permitted is based on the retrieved permission data.

14. The method according to claim 1, wherein the first connection request indicates a communications medium for establishment of the secure device-to-device communications channel.

15. The method according to claim 14, wherein the communications medium is one of Bluetooth™, a local area network, Near Field Communication and Wi-Fi™.

16. The method according to claim 14, wherein the communications medium for establishment of the secure device-to-device communications channel is different from the communications medium associated with the first secure communications channel and the communications medium associated with the second secure communications channel.

17. The method according to claim 1, wherein the first computing device and the second computing device are authenticated by the server.

18. The method according to claim 1, wherein the computing device is a portable computing device.

19. A server system for negotiating a secure device-to-device communications channel between a first computing device and a second computing device, the first computing device being associated with a first user and the second computing device being associated with a second user, wherein the server system comprises:
a non-transitory memory storage comprising instructions; and
one or more hardware processors in communication with the non-transitory memory storage, wherein the one or more hardware processors execute the instructions to:
receive a first connection request comprising first address data and a first cryptographic key associated with a first computing device, the first connection request being received over a first secure communications channel;
receive a second connection request comprising second address data and a second cryptographic key associated with a second computing device, the second connection request being received over a second secure communications channel; and
determine, on the basis of an identity of the first user and an identity of the second user, that the secure device-to-device communication channel is permitted and, dependent on a determination that the secure device-to-device communication channel is permitted:
send first connection data to the first computing device over the first secure communications channel; and
send second connection data to the second computing device over the second secure communications channel;
wherein the first connection data comprises the second address data and second cryptographic key, and the second connection data comprises the first address data and first cryptographic key, the first and second connection data being for use in enabling establishment of a secure device-to-device communications channel between the first computing device and the second computing device.

20. A computer program product comprising a non-transitory computer-readable storage medium having computer readable instructions stored thereon, the computer readable instructions being executable by a computerized device to cause the computerized device to perform a method for negotiating a secure device-to-device communications channel between a first computing device and a second computing device, the first computing device being associated with a first user and the second computing device being associated with a second user, the method comprising:
receiving, at a server, a first connection request comprising first address data and a first cryptographic key associated with a first computing device, the first connection request being received over a first secure communications channel;
receiving, at the server, a second connection request comprising second address data and a second cryptographic key associated with a second computing device, the second connection request being received over a second secure communications channel; and
determining, on an basis of an identity of the first user and an identity of the second user, that the secure device-to-device communication channel is permitted and, dependent on a determination that the secure device-to-device communication channel is permitted:
sending, from the server, first connection data to the first computing device over the first secure communications channel; and
sending, from the server, second connection data to the second computing device over the second secure communications channel;
wherein the first connection data comprises the second address data and second cryptographic key, and the second connection data comprises the first address data and first cryptographic key, the first and second connection data being for use in enabling establishment of a secure device-to-device communications channel between the first computing device and the second computing device.

21. A method of initiating a secure device-to-device communications channel between a first computing device and a second computing device, the method comprising:
sending, to a server from a first computing device, a connection request comprising a first cryptographic key and first address data associated with the first computing device, the connection request being sent over a first secure communications channel, wherein the connection request comprises an indication of a user associated with the second computing device;
receiving, at the first computing device over the first secure communications channel, connection data associated with a second computing device, the connection data comprising permission data, second address data and a second cryptographic key;

establishing a secure device-to-device communications channel with the second computing device using the connection data; and selectively transmitting an application data to the second computing device over the secure device-to-device communications channel based on the permission data.

22. The method according to claim 21, comprising receiving, at the first computing device, a connection notification indicative of a pending connection request from the second computing device, wherein sending of the connection request from the first computing device is responsive to receipt of the connection notification at the first computing device.

23. The method according to claim 21, wherein the connection request comprises a first session identifier.

24. The method according to claim 23, wherein the session identifier corresponds to a user identity associated with the first computing device or the second computing device.

25. The method according to claim 23, wherein the session identifier corresponds to a predetermined challenge exchanged between the first computing device and the second computing device prior to sending of the connection request from the first computing device.

26. The method according to claim 21, wherein the connection request indicates an intended use of the secure device-to-device communications channel.

27. The method according to claim 21, wherein the connection request identifies data to be transferred from the first computing device to the second computing device using the secure device-to-device communications channel.

28. The method according to claim 21, wherein the connection request indicates a specified service running on the first computing device to be shared with the second computing device using the secure device-to-device communications channel.

29. The method according to claim 21, wherein the connection request indicates a communications medium for establishment of the secure device-to-device communications channel.

30. The method according to claim 29, wherein the communications medium is one of Bluetooth™, a local area network, Near Field Communication (NFC) and Wi-Fi™.

31. The method according to claim 21, wherein the first computing device comprises a secure application and the secure device-to-device communications channel is established between the secure application and the second computing device.

32. The method according to claim 31, wherein the secure application controls data transmitted over the secure device-to-device communications channel.

33. The method according to claim 21, wherein the first and second computing devices are portable computing devices.

34. A computing device for secure management of application data, the computing device comprising:
a non-transitory memory storage storing a secure application that comprises instructions for controlling transmission of the application data over a secure device-to-device communications channel; and
one or more hardware processors in communication with the non-transitory memory storage, wherein the one or more hardware processors execute the instructions to:
establish a first secure communications channel to a server;
send, to the server, a connection request comprising a cryptographic key and address data associated with the computing device, the connection request being sent over the first secure communications channel, wherein the connection request comprises an indication of a user associated with a recipient computing device;
receive, from the server, connection data comprising permission data and address data and a cryptographic key associated with the recipient computing device, the connection data being received over the first secure communications channel;
establish a secure device-to-device communications channel with the recipient computing device using the connection data; and
selectively transmit the application data to the recipient computing device over the secure device-to-device communications channel based on the permission data.

35. The computing device according to claim 34, wherein secure application stores the application data in a secure container on the computing device.

36. The computing device according to claim 34, wherein the application data relates to a service provided by the secure application.

37. The computing device according to claim 34, wherein the computing device is a portable computing device.

38. A computer program product comprising a non-transitory computer-readable storage medium having computer readable instructions stored thereon, the computer readable instructions being executable by a computerized device to cause the computerized device to perform a method for initiating a secure device-to-device communications channel between a first computing device and a second computing device, the method comprising:
sending, to a server from a first computing device, a connection request comprising a first cryptographic key and first address data associated with the first computing device, the connection request being sent over a first secure communications channel, wherein the connection request comprises an indication of a user associated with the second computing device;
receiving, at the first computing device over the first secure communications channel, connection data associated with a second computing device, the connection data comprising permission data, second address data and a second cryptographic key;
establishing a secure device-to-device communications channel with the second computing device using the connection data; and
selectively transmitting an application data to the second computing device over the secure device-to-device communications channel based on the permission data.

* * * * *